United States Patent [19]

VanderPol et al.

[11] Patent Number: 4,981,055

[45] Date of Patent: Jan. 1, 1991

[54] PORTABLE FACING TOOL

[75] Inventors: Jerald VanderPol, Eldorado Hills; William E. Sandford, Camino, both of Calif.

[73] Assignee: Tri Tool Inc., Rancho Cordova, Calif.

[21] Appl. No.: 330,804

[22] Filed: Mar. 30, 1989

[51] Int. Cl.⁵ .............................................. B23B 3/22
[52] U.S. Cl. ...................................... 82/113; 82/123; 82/128
[58] Field of Search ........................... 82/113, 123, 128

[56] References Cited

U.S. PATENT DOCUMENTS

| | | | |
|---|---|---|---|
| 4,033,208 | 7/1977 | Gilmore | 82/4 C |
| 4,130,034 | 12/1978 | Benoit | 82/113 |
| 4,185,525 | 1/1980 | Sherer | 82/4 C |
| 4,343,207 | 8/1982 | Paysinger | 82/4 R |
| 4,397,202 | 8/1983 | Mayfield et al. | 82/4 R |
| 4,543,861 | 10/1985 | Kwech et al. | 82/4 C |
| 4,677,884 | 8/1987 | Kwech et al. | 82/4 C |
| 4,762,038 | 8/1988 | Olson | 82/113 |

Primary Examiner—Frederick R. Schmidt
Assistant Examiner—Lawrence Cruz
Attorney, Agent, or Firm—Bacon & Thomas

[57] ABSTRACT

A portable single point facing tool (10) includes a drive system (12,18), a rotating base member (14), a feed control mechanism (40) and a tilting cutting head (32) with a cutting tool (30). The tool feed is driven through a gear system (84,86) synchronously with rotation of the base member, a variable throw crank mechanism (82) and a drive rod (83) so that tool feed rate is infinitely variable relative to speed of rotation of the base member. Direction of tool feed can selectively be set at forward, reverse or zero feed by means of a selectively engageable gear train associated with the feed mechanism (40).

16 Claims, 4 Drawing Sheets

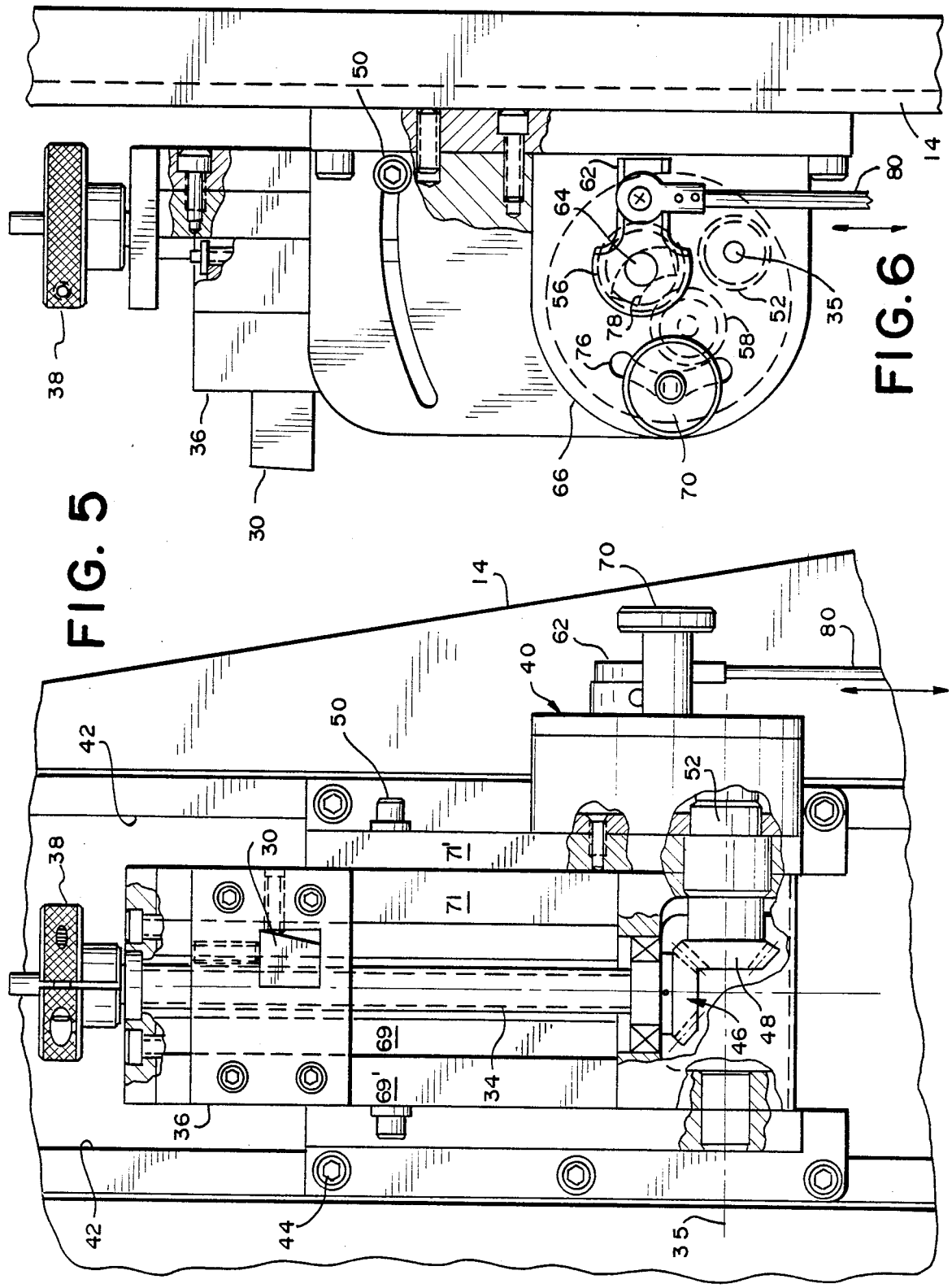

PORTABLE FACING TOOL

BACKGROUND OF THE INVENTION

1. Field of the Invention

This invention relates to a portable single point machine tool for machining flat faces on pipe ends, flanges, beveled weld end preparations and the like.

2. Discussion of Related Technology

Portable facing tools for machining flat and bevel surfaces on pipe ends, flanges, and the like are generally known and are used in the field particularly where the use of a fixed lathe, milling machine or other machine tool is not appropriate or possible. Single point tools, which are set up to trace a circular path with a cutting tool while the cutting tool is moved radially, in a plane generally perpendicular to the rotational axis of the tool are commonly used and various commercial products are known to be used which correspond to this general group of machine tools.

Portable facing tools constructed in accordance with the prior art, however, are generally complex, heavy structures requiring a substantial amount of setup time and are quite cumbersome and heavy. Moreover, the prior art lacks a simple yet effective system for infinitely adjusting the feed rate of the cutting tool during a machining operation, particularly with a tiltable cutting head.

BRIEF SUMMARY OF THE INVENTION

The present invention provides a portable facing tool having a pivotable cutting head that permits single point cutting of flat, beveled or tapered surfaces on the ends of pipes or on flanges while providing an infinitely variable feed rate for the cutting tool.

The infinite feed rate is provided by a variable throw crank system that is connected to a driving gear fixed on the tool housing which engages a smaller pinion gear that provides driving input to the tool feed control system. The rotary motion of the pinion gear is converted into reciprocating movement and in turn is transmitted to a drive rod connected to another motion converter that transforms the reciprocating movement into rotary movement of a feed screw for driving the tool along a cutting path.

The stroke of the reciprocating movement of the drive rod is variable and the reciprocating movement of the drive rod is converted into rotary movement of the feed screw of the tool by means of a one way clutch and variable gear train arrangement. The feed direction of the cutting tool can selectively be forward or reverse in response to the reciprocating movement of the drive rod, or the output of the feed control mechanism can be zero, whereby the drive rod may reciprocate without any feed motion of the cutting tool.

The cutting head of the facing tool is tiltable about a pivot axis in such a manner that tilting movement of the cutting head does not interfere with the tool feed motion from the reciprocating drive rod.

The details of the invention will be evident from the following detailed description of a preferred embodiment of the invention, which is to be taken with reference to the illustrations appended hereto and described below.

DETAILED DESCRIPTION OF THE DRAWINGS

FIG. 5 is a detailed view of the cutting tool carrier area of the facing tool embodying the invention;

FIG. 6 is a side view of the detail shown in FIG. 5; and

DETAILED DESCRIPTION OF THE PREFERRED EMBODIMENT OF THE INVENTION

Figure 1:
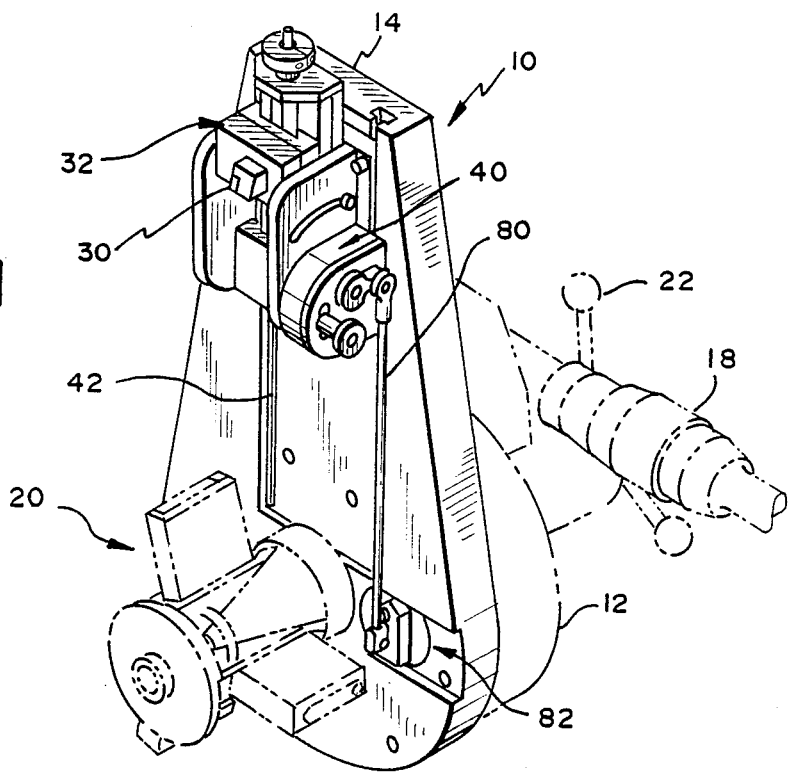
FIG. 1 is a perspective view of the portable facing tool embodying the invention.

With reference to the accompanying illustrations, FIG. 1 is a perspective view of a portable facing tool embodying the invention. The tool comprises a housing 12 arranged to support a base member 14 for rotation about a rotation axis 16 (see FIG. 2). The base 14 as illustrated is elongated radially and may be mounted on the housing 12 by any suitable means, but typically a drive motor 18 is arranged to rotate a pinion gear (not illustrated) engaging a ring gear (not illustrated) within housing 12 for rotating a drive plate (not illustrated) on the front of the housing 12 to which base member 14 is secured. The arrangement of the drive motor 18, pinion gear, ring gear and drive plate are all typical, and reference may be made to U.S. Pat. No. 4,665,782 as an exemplary illustration of a tool drive system that can be used to drive base member 14 in rotation relative to housing 12.

Figure 2:
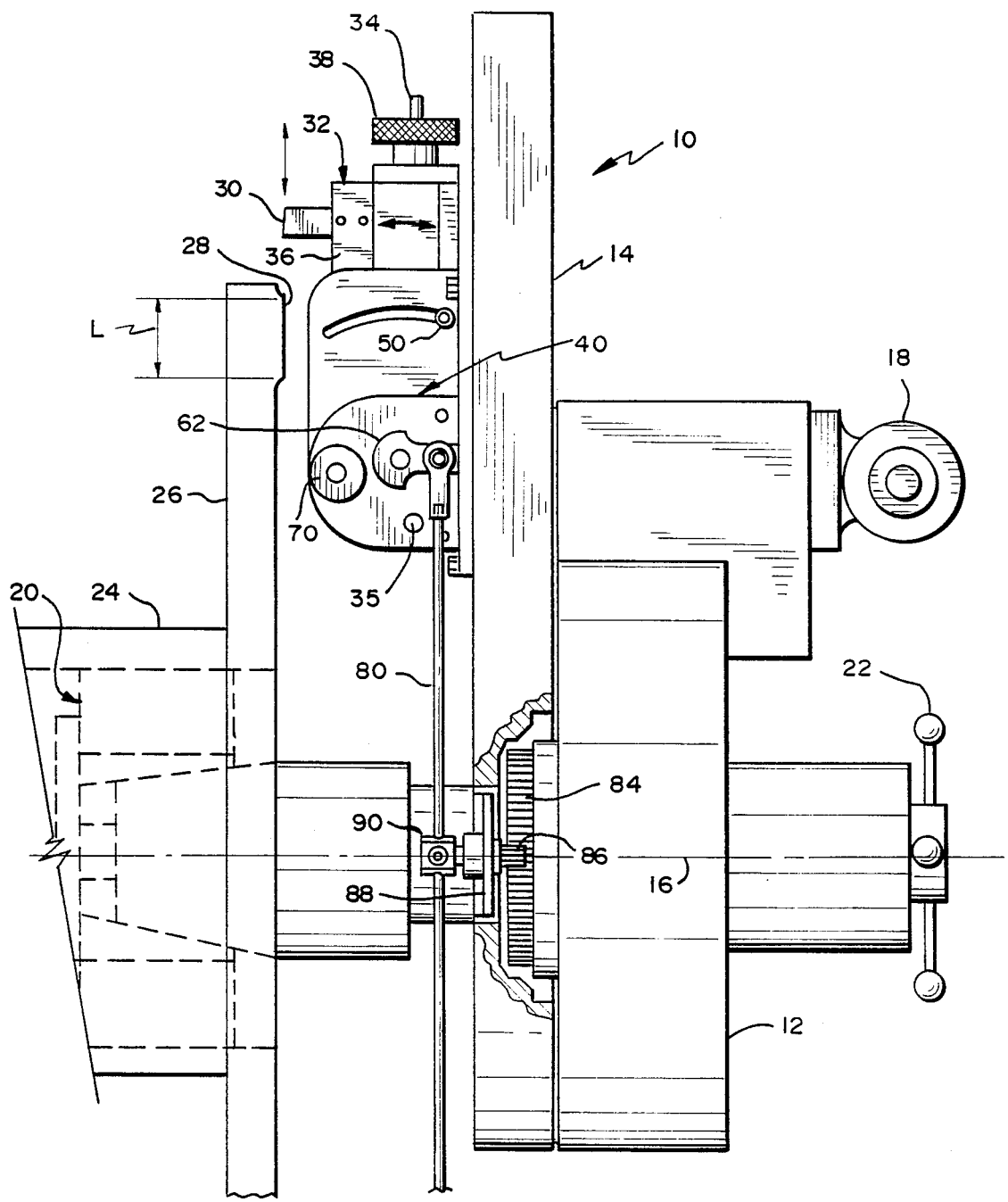
FIG. 2 is a side elevation view of the invention as used with an exemplary workpiece.

In a preferred embodiment of the invention, the portable facing tool 10 is associated with a workpiece engaging mandrel 20 that is manually operable from the opposite end of the tool by a knob 22 to cause engagement of the mandrel 20 with a hollow, annular workpiece, for example, a flanged pipe 24 as shown in FIG. 2. Such mandrels are well known in the prior art and any suitable mandrel means could be utilized in association with the present invention. The mandrel per se does not constitute a part of the present invention and no further description thereof is considered to be necessary.

The general operation of the facing tool is illustrated in FIG. 2, where the mandrel 20 is shown in engagement with the interior diameter of a flanged pipe 24 including a radially extending flange 26 having a radial surface 28 to be machined by a single point facing tool 30 carried by the base member 14. The radial surface 28 includes a length L to be machined by passing the tool 30 across the surface 28 in a circular path about axis 16 while the tool is radially fed along a cutting path determined by the feed direction of the tool 30.

The pipe 24 and its associated flange 26 are exemplary only and it is to be understood that the portable facing tool 10 could be utilized to machine a planar surface of any kind, including, but not limited to, pipe ends, flange surfaces, solid end surfaces, and the like. While a mandrel 20 is shown illustrated as being used with the tool 10, it will be understood that the tool 10 could just as well function without a mandrel when the workpiece is independently supported in a position accessible to the tool in a manner that will permit the precision cutting of a work surface by progressive movement of the tool 30 across the work surface.

The facing tool 30 is supported by a tool carrier assembly 32 that is pivotally supported on base 14 for pivotal movement about axis 35 (FIG. 2) and also includes a cutting tool feed screw 34 which, when rotated, drives tool support 36 (FIG. 2) along a feed path defining a cutting plane along which tool 30 is advanced during a cutting operation. The position of the cutting plane is determined by the angular position of the tool carrier 32 relative to pivot axis 35. Thus, as illustrated in FIG. 2, the cutting plane of the tool 30 extends transversely radially perpendicular to rotational axis 16 of the tool base member 10. Inclination of the tool carrier 32 about axis 35 would cause tool 30 to traverse a cutting path that would be inclined relative to a transversely perpendicular plane intersecting rotation axis 16.

Figure 7:
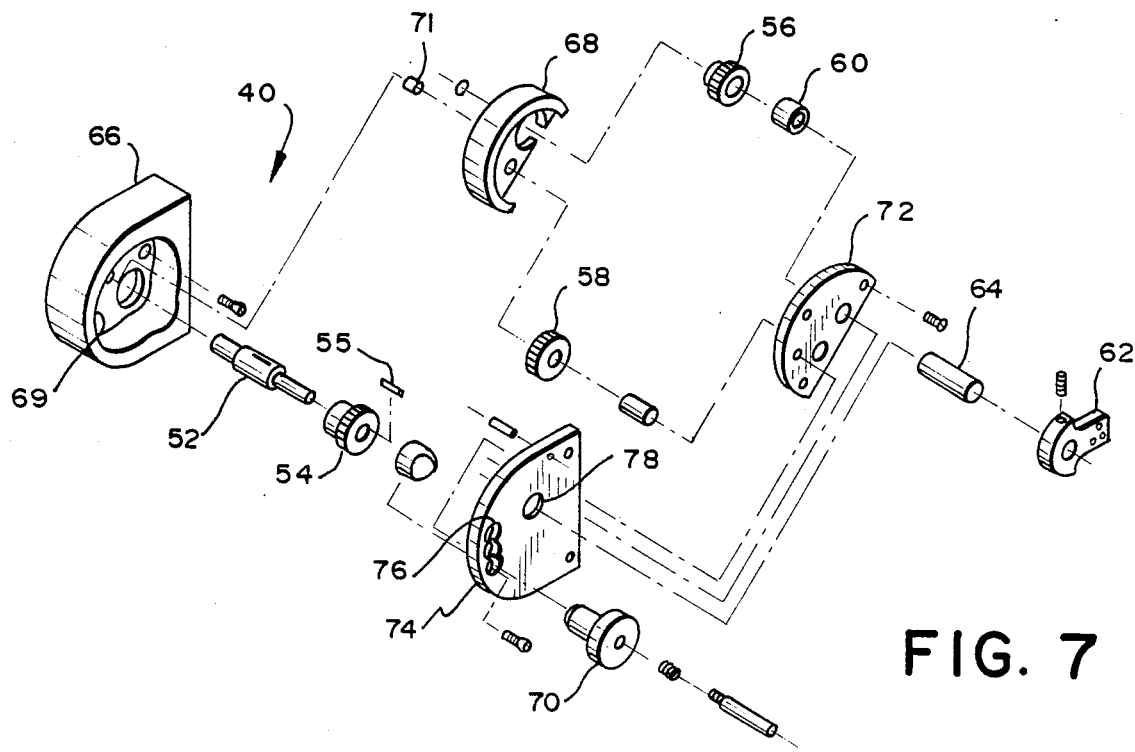
FIG. 7 illustrates the assembly of the feed motion input mechanism for the tool.

Feed screw 34 may be manipulated by control knob 38 for gross adjustments, but is intended to be rotated by a cutting tool feed controller 40 as shown in more detail in FIGS. 5, 6 and 7.

It will be noted that the tool carrier assembly 32 is mounted to base member 14 by means of parallel gibs 42 (FIG. 3) and secured at a radial position along the base 14 by appropriate fasteners 44 that clamp the tool carrier assembly 32 to the base 14 at a fixed radial position relative to rotation axis 16. Once the tool carrier assembly 32 is fixed in position on base 14, it will be noted that rotation of feed screw 34 will cause movement of the tool support 36 relative to the base 14 through a feed nut (not illustrated) within the tool support 36 which is engaged with the feed screw 34.

Feed screw 34 may be manually rotated by manipulation of knob 38 to adjust the starting or rough position of the cutting tool 30 relative to the base 14, but another means must be provided to feed tool 30 along its cutting path during an actual machining operation when the base 14 is rotated about axis 16 and tool 30 is fed along its cutting path to machine a generally radial surface on a workpiece such as is illustrated in FIG. 2.

Accordingly, a tool feed control 40 is provided for driving the feed screw 34 through a bevel gear arrangement 46, 48 as illustrated in FIG. 5. Rotary movement of bevel gear 48 causes rotation of bevel gear 46 which in turn drives lead screw 34 in rotation to radially move cutter tool 30 via tool support 36 along a cutting path determined by the angular position of carrier assembly 32 relative to pivot axis 35.

Rotation of bevel gear 48 is governed by the cutting tool feed controller 40 as will be explained below. However, it is important to note that pivot axis 35 is coincident with the axis of rotation of bevel gear 48 and the axis of bevel gear 46 is coincident with the rotary axis of feed screw 34. Thus, pivotal movement of the tool carrier assembly 32 about pivot 35 can be carried out without interference with transfer of rotary motion between bevel gears 46 and 48. The inclination of the tool carrier assembly 32 relative to the base 14 can be fixed in position by lock nut 50 to maintain the angular position of the carrier assembly 32 relative to base member 14. Lock nut 50 may be associated with a bolt or other fastener to lock tool carrier 32 at a desired degree of inclination relative to base member 14 or any transverse plane extending perpendicular to rotation axis 16. Lock nut 50, as seen in FIG. 5 will secure carrier side plates 69 and 71 relative to locking side plates 69' and 71', respectively.

The cutting tool feed controller 40 will be understood with reference to FIG. 7 while viewing FIGS. 5 and 6. Bevel gear 48 is connected to a drive shaft 52 which is connected to feed pinion gear 54 at its other end by means of a shear pin 55. Feed pinion gear 54 is selectively driven by feed drive gears 56 or 58 as shown in phantom lines in FIG. 6. Drive gear 56 is driven through a one way clutch 60 which in turn is connected to a feed motion input lever 62 by shaft 64. The one way clutch 60 transmits one-way rotary motion only of shaft 64.

The feed controller assembly 40 includes a housing 66 to which is pivotally attached a pivot plate 68 which carries drive gears 56 and 58, along with one way clutch 60, shaft 64 and input lever 62. Pivot plate 68 is rotatable about the center of mating circular opening 69 in which it is received in housing 66, and an appropriate pivot pin 71 may be used to anchor plate 68 in aligned position in opening 69 for pivotal movement in opening 69. Drive gears 56 and 58 are engaged with each other at all times so that, upon intermittent pivotal movement of lever 62 about the axis of shaft 64, one way clutch 60 will drive the drive gear 56 in intermittent unidirectional rotary motion in one direction only. Drive gears 56 and 58 are in engagement at all times, whereby their rotary direction is opposite to each other. Since drive gears 56 and 58 are carried by pivot plate 68, upon relative pivotal movement of pivot plate 68 relative to housing 66, either gear 56 or 58 may be selectively placed into driving engagement with feed pinion gear 54 for driving bevel gear shaft 52 and bevel gear 48 in opposite directions. The direction or rotation of bevel gear 48 will depend on which drive gear 56, 58 is placed in driving engagement with the feed pinion gear 54.

The position of pivot plate 68 is controlled through a feed direction control knob 70 which is secured to the cover plate 72 attached to pivot plate 68. Pivot plate 68 and its associated cover 72 thus may be pivoted relative to housing 66 by means of knob 70 extending through a cover plate 74 associated with housing 66.

Feed direction control knob 70 may be placed in three separate positions by using detents 76 in cover plate 74 whereby pivot plate 68 may be placed in three separate positions whereat, in a first position, drive gear 56 is placed in engagement with feed pinion gear 54 for driving bevel gear 48 in a forward feed direction; a second neutral position whereat pivot plate 68 is located between its end positions whereat neither drive gear 56 nor drive gear 58 is engaged with feed pinion gear 54, resulting in disengagement of feed motion input lever 62 with the feed pinion gear 54; and a third position whereat drive gear 58 is engaged with feed pinion gear 54 to drive bevel gear 48 and feed screw 34 in a reverse direction. This arrangement of pivot plate 68, drive gears 56, 58, feed pinion gear 54 and knob 70 comprises a selectively engageable gear train associated with feed motion input lever 62 to cause selective forward or reverse movement of feed screw 34 in response to oscillating pivotal movement of input lever 62, or zero movement of feed screw 34 in response to movement of input lever 62.

It is to be noted that shaft 64 moves with pivot plate 68 about the pivot axis of the plate 68. A slot 78 is provided in cover plate 74 of housing 66 to accommodate the arcuate movement of shaft 64. Lever 62, of course, attached to shaft 64, likewise moves in an arcuate path with shaft 64.

Figure 3:
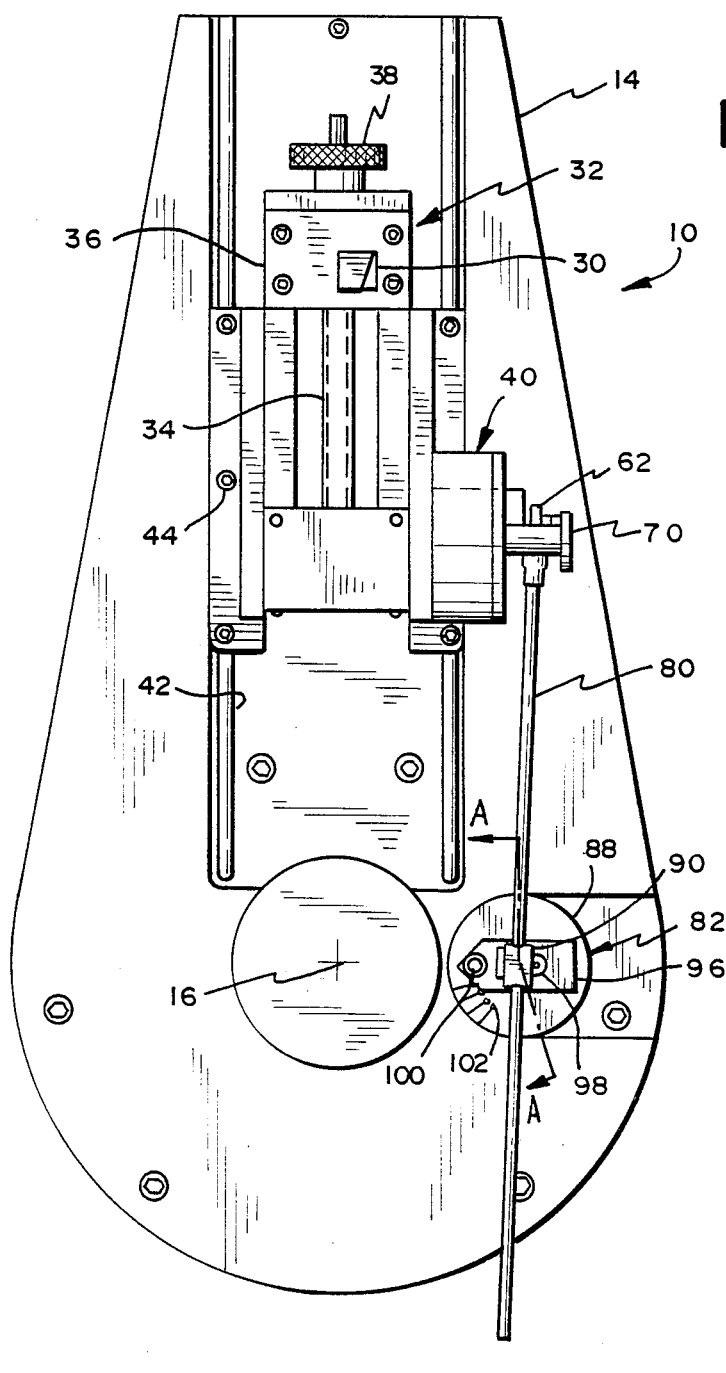
FIG. 3 is a front elevation view of the invention.
Figure 4:
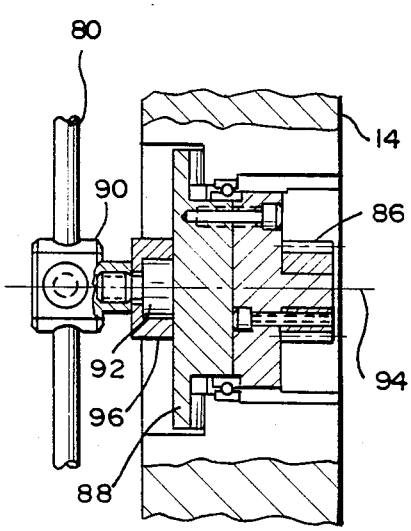
FIG. 4 is a detailed view taken along line A—A in FIG. 3.

Feed motion input lever 62 is arranged to be driven about the axis of shaft 64 by drive rod 80 which in turn is driven reciprocally parallel to its length by a feed motion input system generally designated at 82 and shown in more detail in FIGS. 2, 3 and 4. As shown in FIG. 2, a circular gear 84 is fixed to housing 12 concentric to rotation axis 16. Gear 84 does not rotate with base member 14. A pinion gear 86 meshes with gear 84 and is carried by base member 14 around the periphery of gear 84 whereby, upon rotation of base member 14 relative to housing 12, pinion gear 86 is driven in rotation at a high speed depending upon the ratio between the number of teeth on gear 84 and gear 86. Rotation of pinion gear 86 is transferred directly to drive plate 88 which is connected to drive rod 80 through a variable throw crank arrangement which will be described below. However, it should be noted that the gear arrangement 84-86 could be varied to drive plate 88 in rotation. For example, bevel or miter gears could be used instead of spur gears. Moreover, if desired, a cam and cam follower arrangement could be used to drive plate 88 in rotation independently of rotation of base member 14.

As best seen in FIGS. 3 and 4, rotary movement of pinion gear 86 is transmitted to rotary drive plate 88 disposed on the front end of base member 14. Drive rod 80 in turn is connected to rod connector 90 which carries a connecting pin 92 extending generally parallel with the rotary axis 94 of pinion 86. Pin 92 is not directly connected to drive plate 88, but rather is pivotally connected to adjustable crank element 96 which is connected to drive plate 88 by hinge pin 98 (see FIG. 3) located eccentrically of axis of rotation 94 of pinion 86 and plate 88. Thus, it will be seen that pivotal movement of adjustable crank element 96 about hinge pin 98 will move the position of pin 92 relative to the rotational axis 94, whereby rotary motion of plate 88 will be converted to reciprocating motion of rod 80 whenever pin 92 is disposed eccentrically of axis 94. If pin 92 is disposed concentrically with axis 94, no movement of pin 92 or rod 80 results from rotary motion of plate 88 and pinion 86.

The degree of throw of adjustable crank 96 is manually selected by moving lock pin 100 into engagement with different ones of apertures 102 as adjustable crank 96 is pivoted about its hinge pin 98, which rotates with drive plate 88 about axis 94. Crank 96, of course, is pivotally mounted with respect to rod connector 90 by pin 92 so that the crank action can occur without mechanical binding or interference between the crank, pin and rod.

Operation of the invention will now be explained. Assuming that a workpiece 24, 26 has been located relative to housing 12 and base member 14 such that a surface 28 to be machined is within the working range of cutting tool 30, the position of tool carrier assembly 32 is set up along gibs 42 to bring tool 30 into range for carrying out a facing operation on surface 28. The position of drive rod 80 is adjustable relative to its connector 90 at the feed motion input system 82, and connector 90 is secured to the rod by an appropriate fastener when the tool carrier assembly 32 is locked on gibs 42. The angle of tilt of carrier is adjusted to define the path of cutting to be followed by the tool 30.

The position of tool 30 is then moved into a starting position by manual feed knob 38 and the tool is set up so that, upon rotation of feed screw 34, tool 30 will be driven along a cutting path simultaneously with rotation of base member 14 about rotation axis 16.

Manual adjustment of feed screw 34 can be carried out when feed direction control knob 70 is in its neutral position. Then, to carry out a cutting operation, motor 18 is actuated to drive base member 14 about axis 16 and feed direction control knob is placed in its appropriate position to cause engagement between drive gear 56 and feed pinion gear 54. This will cause transfer of oscillating movement of feed motion input lever 62 to bevel gear 48 to drive lead screw 34 through bevel gear 46 in a direction to advance cutting tool 30 along its cutting path which will result in the machining of surface 28 in a progressive manner as tool 30 circumscribes the workpiece and advances radially in its cutting direction.

Oscillating movement of feed motion input lever 62 is caused by reciprocating movement of drive rod 80 when the connector pin 92 is located eccentrically of axis 94. The variable throw crank mechanism will be adjusted to vary the amount of motion of drive rod 80 relative to rotary movement of drive plate 88 to vary the degree of oscillating movement of input lever 62 with each rotation of drive plate 88. The greater the movement of lever 62 during each oscillating movement, the greater the amount of rotation of feed screw 34 with each rotation of drive plate 88. It will be apparent that the total effect of the variable throw crank arrangement and the one way clutch 60 operating through drive rod 80, oscillating lever 62 and one way clutch 60 is to convert rotary motion of pinion 86 into rotary motion of feed screw 34 in an infinitely variable manner such that constant rotary speed of pinion 86 is converted into variable speed of feed screw 34.

Thus, as base member 14 rotates about its rotation axis 16, cutting tool 30 is automatically advanced in its cutting direction by feed screw 34 at a variable speed determined by the position of the variable crank mechanism 96. Variable feed rates of tool 30 are therefore obtainable in a precise yet simple manner.

It will be understood that the invention could be embodied using various other mechanisms and details of construction that would be apparent to a person skilled in the art and therefore the scope of the invention should not be limited to the specific structural details of the exemplary embodiment illustrated in the drawings and described herein, but only by the claims that now follow.

What is claimed:

1. A portable facing tool comprising:
    a tool housing;
    a tool driver means associated with the housing;
    a base member rotatably supported on the housing for rotary motion about a rotation axis and arranged to be rotated by the tool driver means, the base member extending in a generally radial direction with respect to the rotation axis;
    a cutting tool feed drive means carried by the base member and arranged to rotate synchronously with rotation of the base member;
    a cutting tool feed means carried by the base member and including feed motion input means for driving the cutting tool feed means;
    a cutting tool carrier arranged to be driven along a work feed path by the cutting tool feed means;
    first motion converter means for converting the rotary motion of the cutting tool feed drive means into non-rotary feed drive input motion, the first motion converter means including means for varying the amount of non-rotary feed drive input motion transferred to said cutting tool feed motion input means without varying the speed of rotation of said base member;

motion transfer means for transferring said non-rotary feed drive input motion to said feed motion input means of said cutting tool feed means;

whereby, upon rotation of said base member relative to the housing, said cutting tool feed means is driven by said motion transfer means responsive to movement of said cutting tool feed drive means.

2. A portable facing tool as claimed in claim 1, wherein said transfer varying means is variable to include a zero amount of non-rotary motion transferred to said cutting tool feed motion input means.

3. A portable facing tool as claimed in claim 1, wherein said cutting tool feed drive movement is rotary, and said first motion converter comprises a rotary to linear reciprocating motion converter.

4. A portable facing tool as claimed in claim 1, wherein said cutting tool feed drive means comprises a rotatably mounted pinion gear; a circular drive gear fixed to the housing concentric with the rotation axis; said pinion gear engaged with the drive gear eccentric of the rotation axis so that the pinion gear rotates independently of the base member when the base member is driven in rotation about the rotation axis.

5. A portable facing tool as claimed in claim 3, including a second motion converter arranged to convert linear reciprocating motion to unidirectional intermittent rotary motion, said motion transfer means being connected between the first and second motion converter, said second motion converter being connected in driving relationship with said cutting tool feed motion input means.

6. A portable facing tool as claimed in claim 5, said second motion converter comprising an oscillating lever and a one-way clutch means connected to the lever.

7. A portable facing tool as claimed in claim 1, including means for selectively interrupting the transfer of motion between the cutting tool feed means and the feed motion input means without interference with the feed drive input motion.

8. A portable facing tool as claimed in claim 7, including means for selectively reversing the direction of motion transfer between the cutting tool feed means and the feed motion input means without interrupting the feed drive input motion.

9. A portable facing tool as claimed in claim 1, wherein said cutting tool carrier is pivotally mounted on the base for varying the direction of cutting tool feed motion relative to a transverse radial plane intersecting the rotation axis.

10. A portable facing tool as claimed in claim 1, wherein said means for varying the amount of transfer of feed drive input motion to the feed motion input means comprises a variable throw crank means.

11. A portable facing tool as claimed in claim 8, wherein said means for selectively interrupting and reversing the direction of transfer of motion comprises a selectively engageable gear train.

12. A portable facing tool as claimed in claim 1, including separate manual feed means arranged to drive said cutting tool feed means.

13. A portable facing tool as claimed in claim 1, wherein said cutting tool carrier is pivotally mounted to said base member for pivotal movement about a pivot axis arranged to allow inclination of the work feed path relative to a transverse perpendicular plane intersecting the rotation axis.

14. A portable facing tool as claimed in claim 6, wherein said cutting tool carrier is pivotally mounted to said base member for pivotal movement about a pivot axis arranged to allow inclination of the work feed path relative to a transverse perpendicular plane intersecting the rotation axis, said cutting tool carrier including a cutting tool support and said cutting tool feed means comprising a feed screw drivingly connected to said cutting tool support; a first bevel gear attached to the feed screw; a second bevel gear engaging the first bevel gear; a bevel gear drive shaft connected to the second bevel gear; said cutting tool pivot axis corresponding with the axis of said bevel gear drive shaft, whereby tilting movement of the tool carrier does not interfere with feed drive motion transmitted by said bevel gear drive shaft; said bevel gear drive shaft comprising said cutting tool feed means.

15. A portable facing tool as claimed in claim 14, including a feed pinion gear connected to said bevel gear drive shaft, and a pair of drive gears arranged to be selectively engageable with the feed pinion gear; said drive gears arranged to be driven in reverse directions by said motion transfer means, whereby input feed motion can selectively be transmitted to the feed screw in a forward or reverse direction.

16. A portable facing tool as claimed in claim 15, including means for disengaging both drive gears from the feed pinion gear, whereby input feed motion is not transmitted to the feed pinion gear and the feed screw while input feed motion is uninterrupted.

* * * * *